(12) United States Patent
Khan

(10) Patent No.: US 9,001,774 B2
(45) Date of Patent: Apr. 7, 2015

(54) SYSTEM AND METHOD FOR CHANNEL ESTIMATION IN A DELAY DIVERSITY WIRELESS COMMUNICATION SYSTEM

(71) Applicant: Samsung Electronics Co., Ltd, Suwon-si, Gyeonggi-do (KR)

(72) Inventor: Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/078,204

(22) Filed: Nov. 12, 2013

(65) Prior Publication Data

US 2014/0072061 A1 Mar. 13, 2014

Related U.S. Application Data

(63) Continuation of application No. 13/093,568, filed on Apr. 25, 2011, now Pat. No. 8,582,519, which is a continuation of application No. 11/390,125, filed on Mar. 27, 2006, now Pat. No. 7,953,039.

(60) Provisional application No. 60/673,574, filed on Apr. 21, 2005, provisional application No. 60/673,674, filed on Apr. 21, 2005, provisional application No. 60/679,026, filed on May 9, 2005.

(51) Int. Cl.
*H04W 72/04* (2009.01)
*H04L 27/26* (2006.01)
(Continued)

(52) U.S. Cl.
CPC .......... *H04L 27/2601* (2013.01); *H04B 7/0671* (2013.01); *H04B 7/0684* (2013.01); *H04L 25/022* (2013.01); *H04L 25/0228* (2013.01); *H04L 27/261* (2013.01); *H04L 27/2647* (2013.01); *H04L 25/03955* (2013.01); *H04L 5/0048* (2013.01); *H04B 7/12* (2013.01)

(58) Field of Classification Search
USPC ......... 370/328, 329, 332, 338, 343, 203, 208, 370/210, 292, 480, 491, 498, 500; 375/260, 375/267, 299
See application file for complete search history.

(56) References Cited

U.S. PATENT DOCUMENTS 6,219,334 B1 4/2001 Sato et al.
6,842,487 B1 1/2005 Larsson
(Continued)

FOREIGN PATENT DOCUMENTS

EP 0807989 A1 11/1997
EP 1 185 048 A2 3/2002
(Continued)

OTHER PUBLICATIONS

Search Report dated Jan. 27, 2014 in connection with European Patent Application No. 06732907.8.

*Primary Examiner* — Cong Tran

(57) ABSTRACT

A method of controlling downlink transmissions to a subscriber station capable of communicating with a base station of an orthogonal frequency division multiplexing (OFDM) network. The method comprises the steps of: receiving a first pilot signal from a first base station antenna; receiving a second pilot signal from a second base station antenna; and estimating the channel between the base station and subscriber station based on the received first and second pilot signals. The method also comprises determining a set of OFDM symbol processing parameters based on the step of estimating the channel and transmitting the OFDM symbol processing parameters to the base station. The base station uses the OFDM symbol processing parameters to control the relative gains and the relative delays of OFDM symbols transmitted from the first and second antennas.

10 Claims, 8 Drawing Sheets

(51) Int. Cl.
*H04B 7/06* (2006.01)
*H04L 25/02* (2006.01)
*H04L 25/03* (2006.01)
*H04L 5/00* (2006.01)
*H04B 7/12* (2006.01)

(56) References Cited

U.S. PATENT DOCUMENTS

| | | | |
|---|---|---|---|
| 6,982,670 B2 | 1/2006 | Mohamadi | |
| 7,003,415 B2 | 2/2006 | Jitsukawa et al. | |
| 7,082,159 B2* | 7/2006 | Larsson | 375/224 |
| 7,206,554 B1* | 4/2007 | Lindskog | 455/101 |
| 7,251,291 B1* | 7/2007 | Dubuc et al. | 375/296 |
| 7,428,267 B2 | 9/2008 | Lee et al. | |
| 7,453,793 B1* | 11/2008 | Jones et al. | 370/203 |
| 2004/0086055 A1* | 5/2004 | Li | 375/260 |
| 2004/0110510 A1 | 6/2004 | Jeon et al. | |
| 2004/0131011 A1 | 7/2004 | Sandell et al. | |
| 2004/0156328 A1 | 8/2004 | Walton et al. | |
| 2004/0248527 A1 | 12/2004 | Park et al. | |
| 2005/0163263 A1* | 7/2005 | Gupta et al. | 375/343 |
| 2005/0176436 A1 | 8/2005 | Mantravadi et al. | |
| 2005/0201268 A1* | 9/2005 | Aoki et al. | 370/208 |
| 2005/0265477 A1* | 12/2005 | Takeda et al. | 375/299 |
| 2006/0034163 A1 | 2/2006 | Gore et al. | |
| 2006/0045200 A1* | 3/2006 | Bocquet | 375/267 |
| 2007/0281624 A1 | 12/2007 | Thomas et al. | |
| 2008/0002568 A1 | 1/2008 | Wu et al. | |

FOREIGN PATENT DOCUMENTS

| | | |
|---|---|---|
| EP | 1185001 A2 | 3/2002 |
| EP | 1359684 A1 | 11/2003 |
| EP | 1 453 223 A1 | 9/2004 |

\* cited by examiner

SYSTEM AND METHOD FOR CHANNEL ESTIMATION IN A DELAY DIVERSITY WIRELESS COMMUNICATION SYSTEM

CROSS-REFERENCE TO RELATED APPLICATIONS AND CLAIM OF PRIORITY

The present application is claims priority as a continuation of, and incorporates by reference, U.S. Non-Provisional Application Ser. No. 13/093,568 entitled "SYSTEM AND METHOD FOR CHANNEL ESTIMATION IN A DELAY DIVERSITY WIRELESS COMMUNICATION SYSTEM" filed Apr. 25, 2011, now U.S. Pat. No. 8,582,519, which is a continuation of U.S. Non-Provisional Application Ser. No. 11/390,125 entitled "SYSTEM AND METHOD FOR CHANNEL ESTIMATION IN A DELAY DIVERSITY WIRELESS COMMUNICATION SYSTEM" and filed Mar. 27, 2006, now U.S. Pat. No. 7,953,039, to which the present application also claims priority and incorporates by reference. The present application further claims priority through the above-identified applications to, and incorporates by reference, U.S. Provisional Patent Applications Nos. 60/673,574 and 60/673,674, both entitled "DIVERSITY TRANSMISSION IN AN OFDM WIRELESS COMMUNICATION SYSTEM" and filed Apr. 21, 2005, and to U.S. Provisional Patent Application No. 60/679,026, entitled "CHANNEL ESTIMATION IN A DELAY DIVERSITY WIRELESS COMMUNICATION SYSTEM" and filed May 9, 2005.

TECHNICAL FIELD OF THE INVENTION

The present disclosure relates generally to wireless communications and, more specifically, to an apparatus and method for performing channel estimation in an orthogonal frequency division multiplexing (OFDM) network or an orthogonal frequency division multiple access (OFDMA) network.

BACKGROUND OF THE INVENTION

Conventional orthogonal frequency division multiplexing (OFDM) networks and orthogonal frequency division multiple access (OFDMA) network are able to improve the reliability of the channel by spreading and/or coding data traffic and control signals over multiple subcarriers (i.e., tones). However, if the channel is flat, frequency diversity cannot be achieved. In order to overcome this, it is possible to introduce artificial frequency diversity into the transmitted signal. A technique for artificially introducing frequency diversity into an OFDM environment was disclosed in U.S. patent application Ser. No. 11/327,799, filed on Jan. 6, 2006 and incorporated by reference above. In the device disclosed in Ser. No. 11/327,799, multiple copies of the same OFDM symbol are delayed by different delay values, then amplified by the same or different gain values, and then transmitted from different antennas. This artificially introduces frequency-selective fading in the OFDM channel, thereby allowing frequency selectivity to be exploited using frequency-domain scheduling for low-to-medium speed mobile devices or frequency diversity for higher speed mobile devices.

However, when selecting the symbol processing parameters (i.e., delay values and the gain values) applied to the OFDM symbols, it is important to take into consideration the user channel type and the mobile speed. To accomplish this, channel estimation is performed and the symbol processing parameters are determined based on the channel estimates and mobile speed. Therefore, there is a need for improved apparatuses and methods for performing channel estimation in an OFDM wireless network that artificially introduces frequency diversity by delaying and amplifying multiple copies of the same OFDM symbol and then transmitting the delayed and amplified OFDM symbols from different transmit antennas.

SUMMARY OF THE INVENTION

A method of controlling downlink transmissions to a subscriber station is provided for use in a subscriber station capable of communicating with a base station of an orthogonal frequency division multiplexing (OFDM) network. The method comprises the steps of: receiving a first pilot signal from a first antenna of the base station; receiving a second pilot signal from a second antenna of the base station; estimating the channel between the base station and subscriber station based on the received first and second pilot signals; determining a set of OFDM symbol processing parameters based on the step of estimating the channel, wherein the OFDM symbol processing parameters are usable by the base station to control the relative gains and the relative delays of OFDM symbols transmitted from the first and second antennas; and transmitting the OFDM symbol processing parameter set to the base station.

According to another embodiment of the present disclosure, a subscriber station capable of communicating with a base station of an orthogonal frequency division multiplexing (OFDM) network is provided. The subscriber station comprises: receive path circuitry capable of receiving a first pilot signal from a first antenna of the base station and receiving a second pilot signal from a second antenna of the base station; and channel estimating circuitry capable of estimating the channel between the base station and subscriber station based on the received first and second pilot signals and capable of determining a set of OFDM symbol processing parameters based on a channel quality estimate. The OFDM symbol processing parameters are usable by the base station to control the relative gains and the relative delays of OFDM symbols transmitted from the first and second antennas and wherein the subscriber station is capable of transmitting the OFDM symbol processing parameters to the base station.

According to yet another embodiment of the present disclosure, a base station is provided for use in an orthogonal frequency division multiplexing (OFDM) network. The base station comprises: 1) receive path circuitry capable of receiving an uplink signal from a subscriber station, estimating the channel between the base station and subscriber station based on the received uplink signal, and determining a set of OFDM symbol processing parameters based on a channel quality estimate; and 2) transmit path circuitry capable of using the OFDM symbol processing parameters to control the relative gains and the relative delays of processed OFDM symbols transmitted from a first antenna and a second antenna of the base station. The base station is capable of transmitting the OFDM symbol processing parameters to the subscriber station. The OFDM symbol processing parameters are based on the multipath characteristics and the frequency selectivity characteristics of the channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
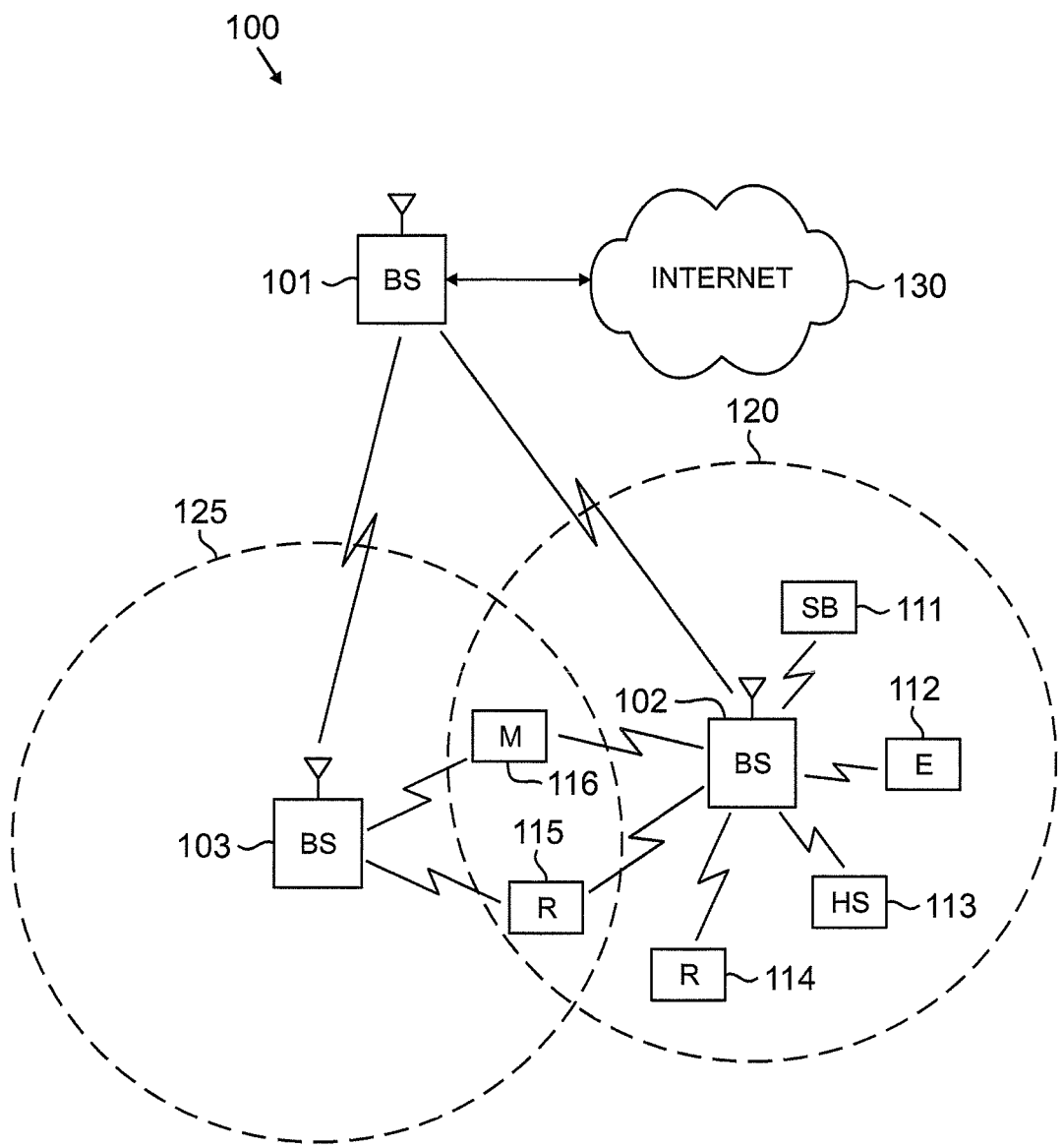
FIG. 1 illustrates an exemplary orthogonal frequency division multiplexing (OFDM) wireless network that is capable of performing channel estimation according to the principles of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present disclosure is directed to apparatuses and algorithms for channel estimation and channel quality estimation for demodulation and data rate selection in an orthogonal frequency division multiplexing (OFDM) wireless network that uses delayed diversity. Such a delayed diversity wireless network was disclosed previously U.S. patent application Ser. No. 11/327,799, incorporated by reference above. The present disclosure uses a number of factors, including user channel type and mobile speed, to select OFDM symbol processing parameters (i.e., delays D1, D2, ..., DP and gains $g_0, g_1, \ldots, g_P$) for OFDM symbols transmitted from up to P antennas (i.e., ANT1 to ANTP). Therefore, different OFDM symbol processing parameters may be used to transmit to different mobile devices that are scheduled simultaneously, depending upon their channel types.

It is noted that the scope of the present disclosure is not limited to orthogonal frequency division multiplexing (OFDM) wireless networks. The present disclosure is also applicable to orthogonal frequency division multiple access (OFDMA) wireless networks. However, for simplicity and brevity, the embodiments described below are directed to OFDM wireless networks, except where otherwise noted or where the context indicates otherwise.

For relatively low-speed mobile devices, it is usually possible to track changes in the channel, thereby allowing channel sensitive scheduling to improve performance. Thus, the OFDM symbol processing parameters may be selected in such a way that relatively large coherence bandwidth results. That is, a relatively larger number of subcarriers experience similar fading. This goal may be achieved by keeping the delays for OFDM symbols from different antennas relatively small. A mobile device may then be scheduled on a subband consisting of contiguous subcarriers.

For relatively high-speed mobile devices, channel quality variations cannot be tracked accurately, so that frequency-diversity may be helpful. Thus, the OFDM symbol processing parameters are selected in such a way that relatively small coherence bandwidth results. That is, potentially independent fading may occur from subcarrier to subcarrier. This goal may be achieved by having relatively large delays for OFDM symbols transmitted from different antennas.

The symbol processing parameters may also be selected based on the degree of frequency-selectivity already present in the channel. For example, if a channel already has a lot of multipath effects and is, therefore, frequency selective, there may be little or no need for additional frequency selectivity. The OFDM symbol processing parameters may be selected on a user-by-user basis because different mobile devices experience different channel types.

FIG. 1 illustrates exemplary orthogonal frequency division multiplexing (OFDM) wireless network 100, which is capable of performing channel estimation according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
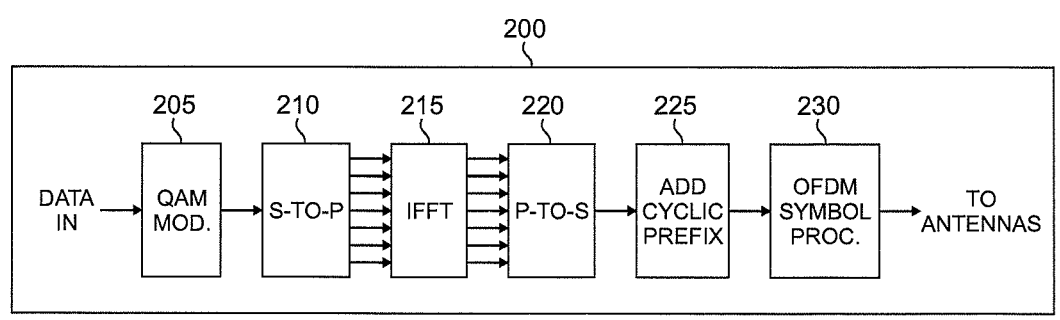
FIG. 2A is a high-level diagram of the orthogonal frequency division multiplexing (OFDM) transmit path in a base station according to one embodiment of the disclosure.
Figure 2B:
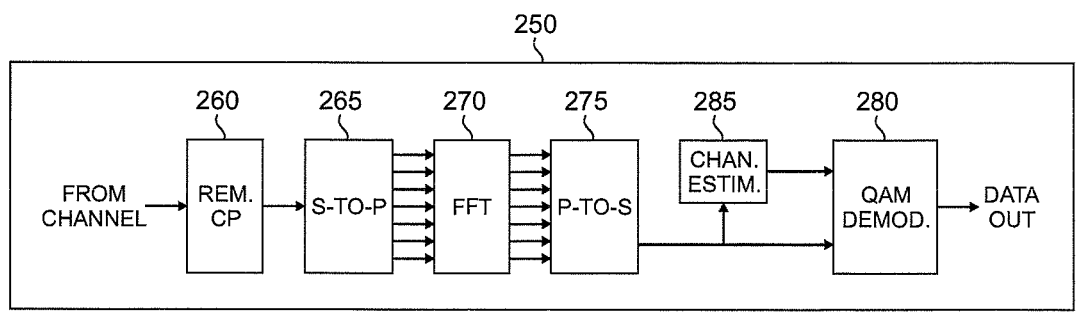
FIG. 2B is a high-level diagram of the orthogonal frequency division multiplexing (OFDM) receive path in a subscriber station according to one embodiment of the disclosure.

FIG. 2A is a high-level diagram of the transmit path in orthogonal frequency division multiplexing (OFDM) transmitter 200 according to an exemplary embodiment of the disclosure. FIG. 2B is a high-level diagram of the receive path in orthogonal frequency division multiplexing (OFDM) receiver 260 according to an exemplary embodiment of the disclosure. OFDM transmitter 200 comprises quadrature amplitude modulation (QAM) modulator 205, serial-to-parallel (S-to-P) block 210, Inverse Fast Fourier Transform (IFFT) block 215, parallel-to-serial (P-to-S) block 220, add cyclic prefix block 225, and OFDM symbol processing block 230. OFDM receiver 250 comprises remove cyclic prefix block 260, serial-to-parallel (S-to-P) block 265, Fast Fourier Transform (FFT) block 270, parallel-to-serial (P-to-S) block 275, quadrature amplitude modulation (QAM) demodulator 280, and channel estimation block 285.

At least some of the components in FIGS. 2A and 2B may be implemented in software while other components may be implemented by configurable hardware or a mixture of software and configurable hardware. In particular, it is noted that the FFT blocks and the IFFT blocks described in FIGS. 2A and 2B may be implemented as configurable software algorithms, where the values of FFT and IFFT sizes may be modified according to the implementation.

QAM modulator 205 receives a stream of input data and modulates the input bits (or symbols) to produce a sequence of frequency-domain modulation symbols. Serial-to-parallel block 210 converts (i.e., de-multiplexes) the serial QAM symbols to parallel data to produce M parallel symbol streams where M is the IFFT/FFT size used in OFDM transmitter 200 and OFDM receiver 250. IFFT block 215 then performs an IFFT operation on the M parallel symbol streams to produce time-domain output signals. Parallel-to-serial block 220 converts (i.e., multiplexes) the parallel time-domain output symbols from IFFT block 215 to produce a serial time-domain signal.

Add cyclic prefix block 225 then inserts a cyclic prefix to each OFDM symbol in the time-domain signal. As is well known, the cyclic prefix is generated by copying the last G samples of an N sample OFDM symbol and appending the copied G samples to the front of the OFDM symbol. Finally, OFDM symbol processing block 230 processes the incoming OFDM symbols as described in FIG. 3 and as described in U.S. patent application Ser. No. 11/327,799. The process OFDM samples at the output of OFDM symbol processing block 230 are then sent to up-conversion circuitry (not shown) prior to being transmitted from multiples transmit antennas.

The transmitted RF signal arrives at OFDM receiver 250 after passing through the wireless channel and reverse operations to those in OFDM transmitter 200 are performed. Remove cyclic prefix block 260 removes the cyclic prefix to produce the serial time-domain baseband signal. Serial-to-parallel block 265 converts the time-domain baseband signal to parallel time domain signals. FFT block 270 then performs an FFT algorithm to produce M parallel frequency-domain signals. Parallel-to-serial block 275 converts the parallel frequency-domain signals to a sequence of QAM data symbols. QAM demodulator 280 then demodulates the QAM symbols to recover the original input data stream. Channel estimation block 285 also receives the QAM data symbols from parallel-to-serial block 275 and performs channels estimation. As will be described below in greater detail, the channel estimation values are used to determine a parameter set of gain values and delay values that are used in OFDM symbol processing block 230 in OFDM transmitter 200 and are used by QAM demodulator 280 to demodulate the QAM data symbols.

The exemplary transmit path of OFDM transmitter 200 may be representative of the transmit paths of any one of base stations 101-103 or any one of subscriber stations 111-116. Similarly, the exemplary receive path of OFDM receiver 250 may be representative of the transmit paths of any one of base stations 101-103 or any one of subscriber stations 111-116. However, since multiple antenna configurations are more common in base stations than in subscriber stations or other mobile devices, for the sake of simplicity and clarity, the descriptions that follow will be directed toward transactions between a base station (e.g., BS 102) that implements a transmit path similar to OFDM transmitter 200 and a subscriber station (e.g., SS 116) that implements a receive path similar to OFDM receiver 250. However, such an exemplary embodiment should not be construed to limit the scope of the present disclosure. It will be appreciated by those skilled in the art that in cases where multiple antennas are implemented in a subscriber station, the transmit path and the receiver path of both the base station and the subscriber station may be implemented as in shown in FIGS. 2A and 2B.

Figure 3:
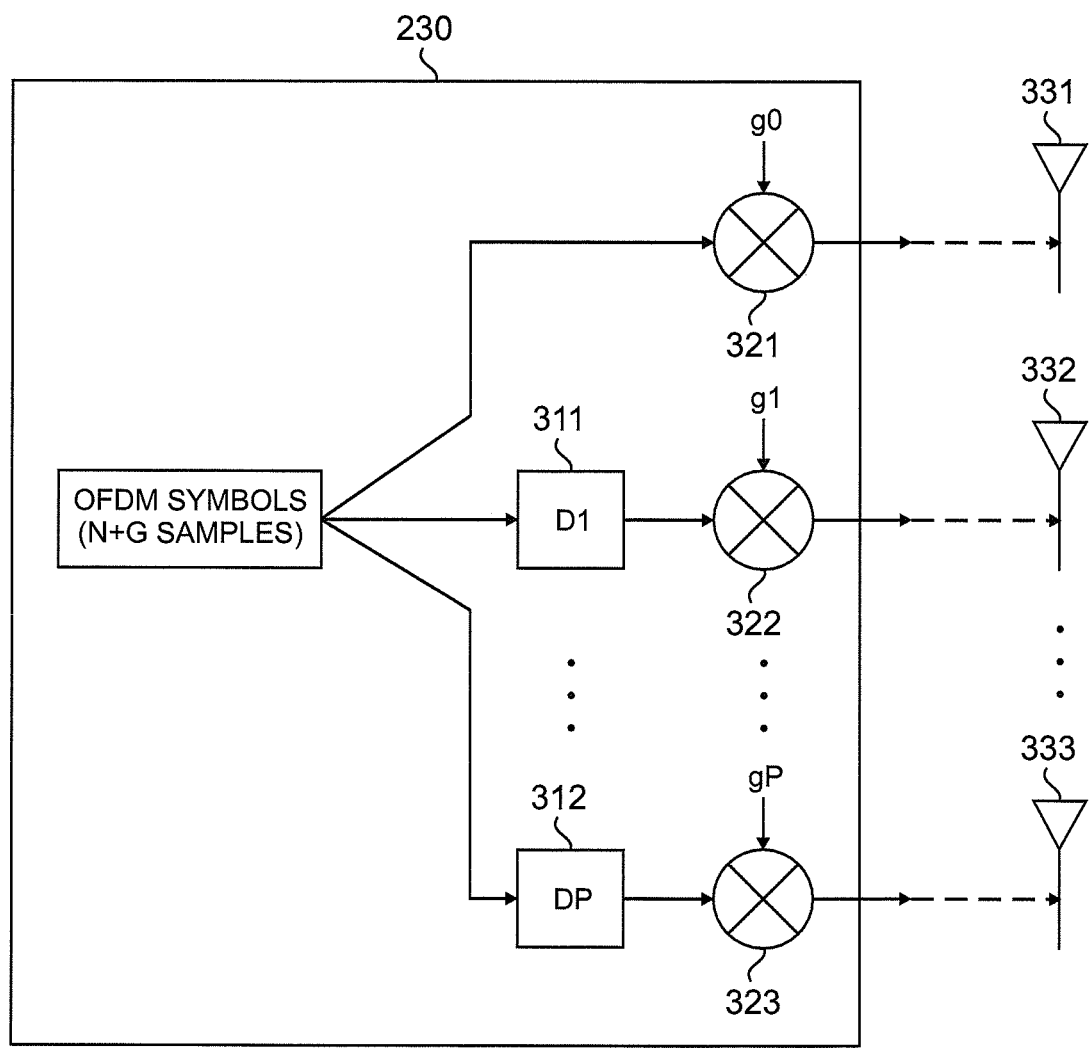
FIG. 3 illustrates the OFDM symbol processing block in the base station in greater detail according to an exemplary embodiment of the present disclosure.

FIG. 3 illustrates OFDM symbol processing block 230 in greater detail according to an exemplary embodiment of the present disclosure. OFDM symbol processing block 230 comprises P delay elements, including exemplary delay elements 311 and 312, P+1 amplifiers, including exemplary amplifiers 321, 322 and 323, and P+1 transmit antennas, including exemplary antennas 331, 332 and 333. Delay elements 311 and 312 are arbitrarily labeled "D1" and "DP", respectively. OFDM symbol processing block 230 receives incoming OFDM symbols and forwards P+1 copies of each OFDM symbol to the P+1 transmit antennas. Each OFDM symbol comprises N+G samples, where N is the number of samples in the original data symbol and G is the number of samples in the cyclic prefix appended to the original symbol.

A first copy of each OFDM symbol is applied directly to the input of amplifier 321, amplified by a gain value, g0, and sent to antenna 331. A second copy of each OFDM symbol is delayed by delay element 311, applied to the input of amplifier 322, amplified by a gain value, g1, and sent to antenna 332. Other copies of each OFDM symbol are similarly delayed and amplified according to the number of antennas. By way of example, the P+1 copy of each OFDM symbol is delayed by delay element 312, applied to the input of amplifier 323, amplified by a gain value, gP, and sent to antenna 333. The gain values and the delay values are determined by the values in an OFDM symbol processing parameter set, as described hereafter and in U.S. patent application Ser. No. 11/327,799. The result is that multiple copies of each OFDM are transmitted, wherein each copy of an OFDM symbol is amplified by a selected amount and delayed by a selected amount relative to other OFDM symbol copies. U.S. patent application Ser. No. 11/327,799, incorporated by reference above, describes a number of architectures for OFDM symbol processing block 230 that achieve such a result. In an advantageous embodiment, the delays introduced by OFDM symbol processing block 230 are cyclic delays, as disclosed in U.S. patent application Ser. No. 11/327,799.

Figure 4A:
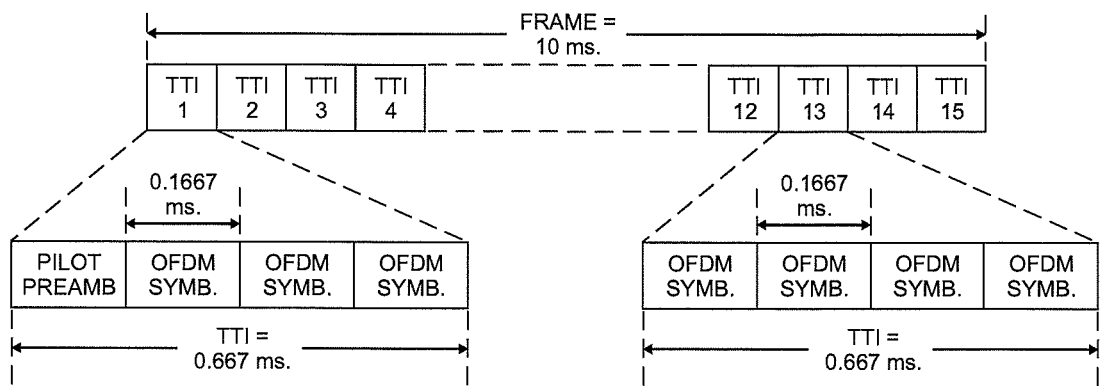
FIG. 4A illustrates data traffic transmitted in the downlink from a base station to a subscriber station according to an exemplary embodiment of the present disclosure.

FIG. 4A illustrates data traffic transmitted in the downlink from base station 102 to subscriber station 116 according to an exemplary embodiment of the present disclosure. An exemplary frame of OFDM data is 10 milliseconds in length and comprises fifteen (15) transmit time intervals (TTIs), namely TTI 1 through TTI 15, where each one of TTI 1 through TTI 15 is 0.667 milliseconds in duration. Within each of TTI 2 through TTI 15, there are four OFDM data symbols, where each OFDM data symbol is 0.1667 milliseconds in duration. In the first TTI, namely TTI 1, there are three OFDM data symbols that are preceded by a pilot preamble symbol. The pilot preamble symbol is used by SS 116 to perform synchronization channel estimation and to determine the OFDM symbol processing parameter set.

Figure 4B:
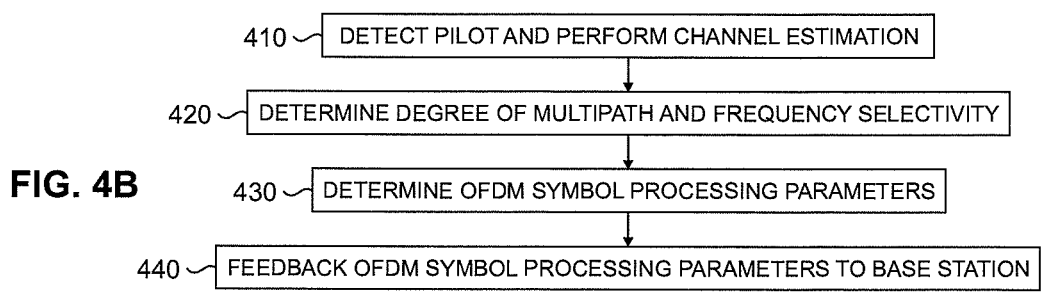
FIG. 4B is a flow diagram illustrating the determination of the user channel type based on the measurements on the preamble according to an exemplary embodiment of the disclosure.

FIG. 4B is a flow diagram illustrating the determination of the user channel type based on the measurements on the preamble according to an exemplary embodiment of the disclosure. In an OFDM system, a known pilot sequence is transmitted for one or more OFDM symbol durations. Channel estimation block 285 in the receiver (i.e., SS 116) detects the known pilot signal, which is then use to perform synchronization (process step 410). Channel estimation block 285 uses the detected preamble symbols to determine the degree of multipath effects in the channel and, therefore, the frequency selectivity in the channel between BS 102 and SS 116 (process step 420).

Based on the profile of the channel, channel estimation block 285 (or another processing element or controller in SS 116) determines (i.e., calculates) a set of OFDM symbol processing parameters (i.e., gain values and delay values) that may be used in BS 102 to improve reception of OFDM symbols in SS 116 (process step 430). SS 116 then feeds back the OFDM symbol processing parameter set to BS 102 in the uplink (process step 440). Other factors, such as mobile speed, can also be used in determining (or calculating) the OFDM symbol processing parameters. The channel type may also be determined by using other mechanisms, such as reference in time-frequency.

In this manner, BS 102 receives an OFDM symbol processing parameter set from each subscriber station. Thereafter, as BS 102 schedules each subscriber station to receive data, BS 102 uses the OFDM symbol processing parameter set for that subscriber station to modify the OFDM symbols transmitted from each antenna for BS 102. For example, BS 102 may use OFDM Symbol Processing Parameter Set A to transmit OFDM symbols from two or more antennas to SS 116 and may use OFDM Symbol Processing Parameter Set B to simultaneously transmit OFDM symbols from two or more antennas to SS 115.

Figure 5:
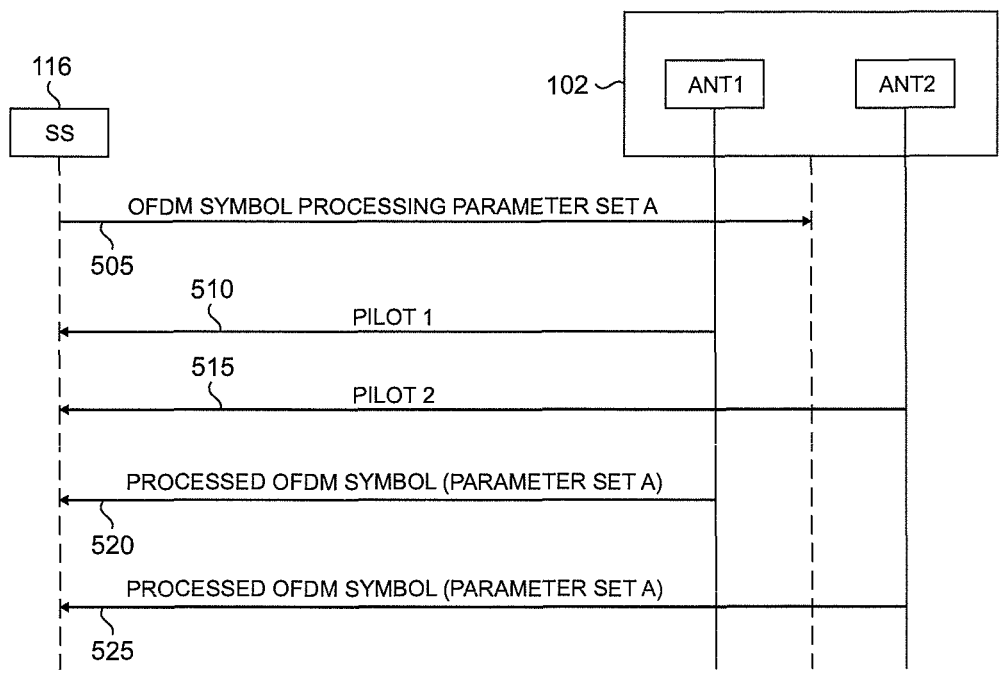
FIG. 5 is a message flow diagram illustrating the transmission of OFDM symbols from a base station to a subscriber station according to the principles of the disclosure.

FIG. 5 is a message flow diagram illustrating the transmission of OFDM symbols from base station 102 to subscriber station 116 according to one embodiment of the disclosure. In this example, base station 102 uses two transmit antennas (first antenna ANT1 and second antenna ANT 2) to transmit to SS 116. SS 116 receives a first pilot signal (Pilot1) from antenna ANT1 and receives a second pilot signal (Pilot2) from antenna ANT 2. SS A then determines OFDM Symbol Processing Parameter Set A as described above in FIGS. 4A and 4B.

Next, SS 116 transmits OFDM Symbol Processing Parameter Set A to BS 102 in signal 505. Thereafter, BS 102 uses OFDM Symbol Processing Parameter Set A to transmit OFDM data symbols in the downlink back to SS 116. As noted above, the OFDM symbol processing parameters in Parameter Set A consist of symbol delays and gains from the two antennas. By way of example, in signal 520, BS 102 transmits from ANT1 processed OFDM symbols that were processed using Parameter Set A. In signal 525, BS 102 simultaneously transmits from ANT2 processed OFDM symbols that were processed using Parameter Set A.

BS 102 also simultaneously transmits pilot signal 510 (Pilot1) and pilot signal 515 (Pilot2) from the two transmit antennas, ANT 1 and ANT 2. In the embodiment in FIG. 5, Pilot1 and Pilot2 are not processed using the parameters in OFDM Symbol Processing Parameter Set A. This is due to the fact that another transmission may be scheduled at the same time for another subscriber station on other OFDM subcarriers using a different set of OFDM symbol processing parameters. The pilot signals must be correctly understood by all the subscriber stations scheduled in the cell, so the pilot signals are not modified using OFDM Symbol Processing Parameter Set A.

Figure 6:
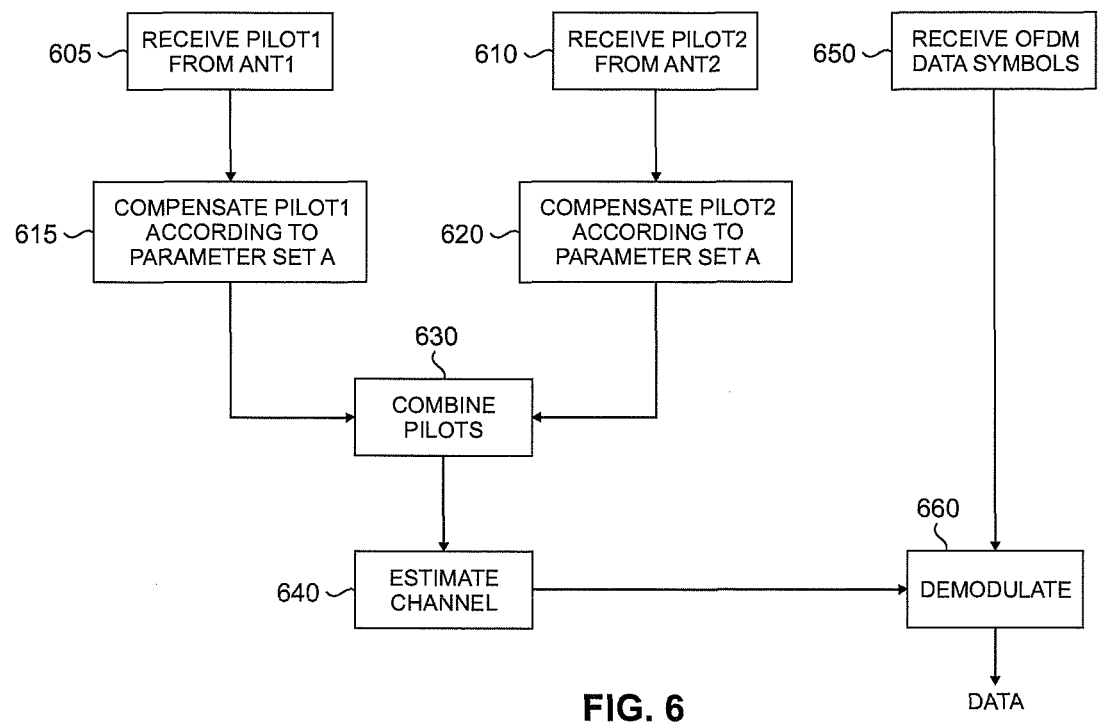
FIG. 6 is a flow diagram illustrating the processing of pilot signals and OFDM data symbols according to an exemplary embodiment of the present disclosure.

FIG. 6 is a flow diagram illustrating the processing of pilot signals and OFDM data symbols according to an exemplary embodiment of the present disclosure. Because the OFDM symbols in signals 520 and 525 are processed using the values in OFDM Symbol Processing Parameter Set A, signals 520 and 525 are combined during transmission over the radio link in such a way that single OFDM symbols are received in SS 116 from BS 102 (process step 660). Since pilot signals 510 and 515 (Pilot1 and Pilot2) are transmitted on orthogonal subcarriers from antenna ANT1 and antenna ANT2, pilot signals 510 and 515 are received separately at SS 116 (process steps 605 and 610).

In order to get correct channel estimation for demodulation, SS 116 compensates pilot signals 510 and 515 (Pilot1 and Pilot2) from antennas ANT1 and ANT2 using the Parameter Set A received from channel estimation block 285 (process steps 615 and 620). Compensated pilot signals 510 and 515 are then combined (process step 630) and the overall channel estimate is obtained (process step 640). This overall channel estimate is then used by demodulator 280 to demodulate the processed data symbols carried in the OFDM subcarriers (process step 660).

Figure 7:
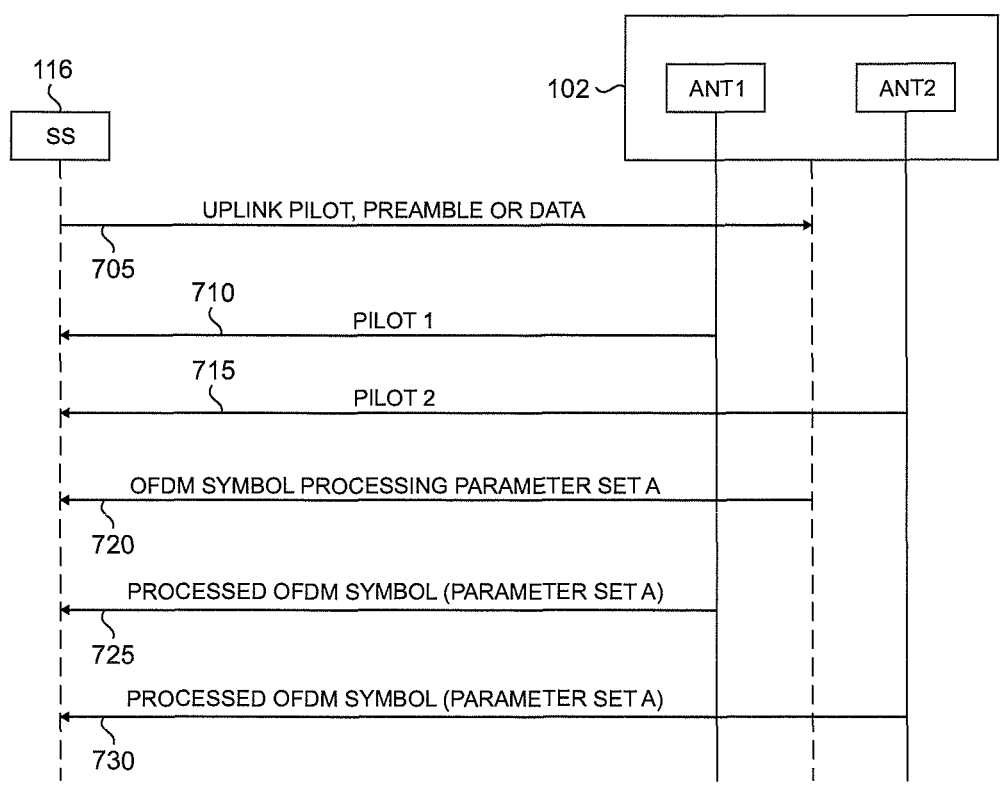
FIG. 7 is a message flow diagram illustrating the transmission of OFDM symbols from a base station to a subscriber station according to another embodiment of the disclosure.

FIG. 7 is a message flow diagram illustrating the transmission of OFDM symbols from base station 102 to subscriber station 116 according to another embodiment of the disclosure. In FIG. 7, the OFDM symbol processing parameters are determined in base station (BS) 102, rather than in subscriber station (SS) 116. BS 102 may determine (or estimate) the OFDM symbol processing parameters in Parameter Set A from a number of different uplink signals 705 transmitted by SS 116, including pilot signals 705, preamble signals 705 and/or data signals 705 from SS 116.

In this example, since Pilot1 signal 710 and Pilot2 signal 715 are not processed using Parameter Set A, BS 101 transmits OFDM Symbol Processing Parameter Set A to SS 116 in control message 720. SS 116 then uses the OFDM symbol processing parameters as described in FIGS. 2-6. BS 102 transmits processed OFDM symbols 725 from ANT1 and processed symbols 720 from ANT2 using the gain and delay values in Parameter Set A. SS 116 uses the same gain and delay parameters in control message 720 to compensate the pilots and to perform the overall channel estimation for data demodulation.

Figure 8:
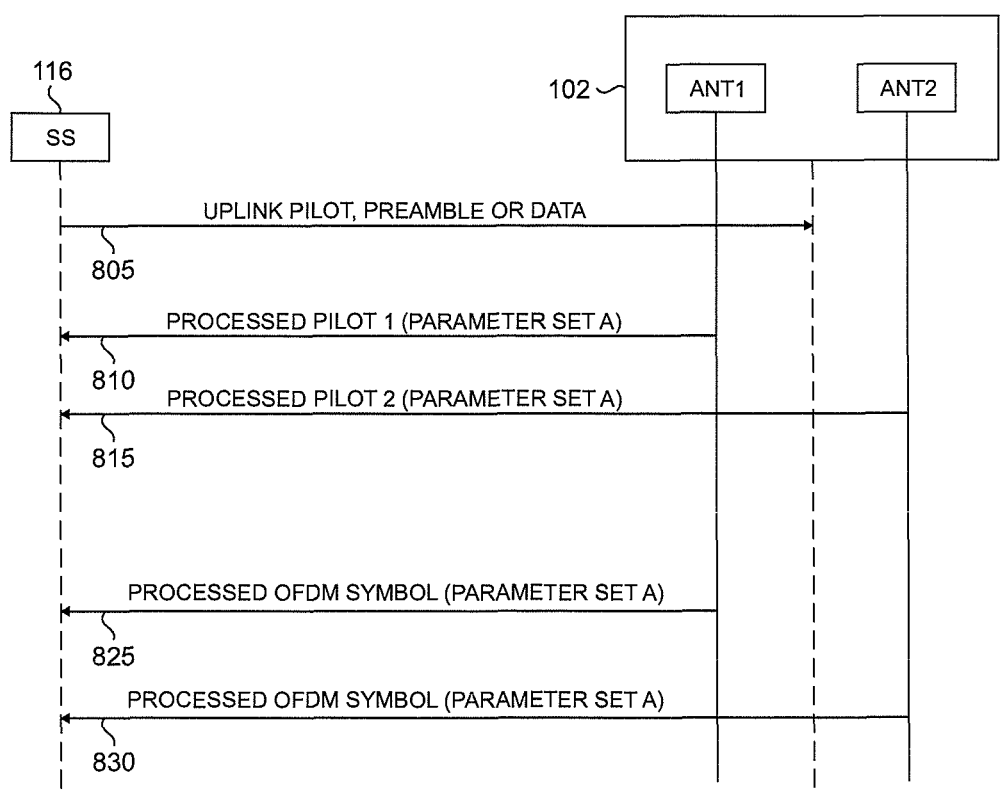
FIG. 8 is a message flow diagram illustrating the transmission of OFDM symbols from a base station to a subscriber station according to another embodiment of the disclosure.

FIG. 8 is a message flow diagram illustrating the transmission of OFDM symbols from base station 102 to subscriber station 116 according to another embodiment of the disclosure. Similar to FIG. 7, the OFDM symbol processing parameters in FIG. 8 are again determined in base station (BS) 102 for the case of two transmit antennas, rather than in subscriber station (SS) 116. BS 102 may determine (or estimate) the OFDM symbol processing parameters in Parameter Set A from a number of different uplink signals 805 transmitted by SS 116, including pilot signals 805, preamble signals 805 and/or data signals 805 from SS 116.

However, unlike FIG. 7, Pilot1 signal 810 from ANT1 and Pilot2 signal 815 from ANT2 are processed using Parameter Set A. In this case, the Pilot1 signal and the Pilot2 signal both use the same OFDM subcarriers. In other words, the two pilots are not transmitted on orthogonal subcarriers. Therefore, the Pilot1 signal and the Pilot2 signal are received in SS 116 as a single signal that can be directly used for overall channel estimation. The channel estimates are then used for data demodulation. BS 102 also transmits processed OFDM symbols 825 from ANT1 and processed symbols 820 from ANT2 using the gain and delay values in Parameter Set A.

In a scenario where the Pilot1 signal and the Pilot2 signal are not compensated, the channel quality estimate is based on the pilot signal strengths SS 116 receives from the two transmit antennas, ANT1 and ANT2. SS 116 compensates the Pilot1 signal and the Pilot2 signal using the OFDM symbol processing parameters. This gives an estimate of the expected channel quality when BS 102 transmits OFDM symbols using the OFDM symbol processing parameters for SS 116. SS 116 then transmits a channel quality estimate (CQE) message back to BS 102. BS 102 determines an optimum data rate based on the channel quality estimate (CQE) message from SS 116 and then transmits processed OFDM symbols at that data rate.

In SS 116, processed OFDM symbols containing data are processed using gain g0 from ANT1, gain g1 from ANT2 and delay D1 from ANT 2. These operations reverse the operations in OFDM symbol processing block 230 in FIG. 3, assuming only transmit antenna 331 (i.e., ANT1) and transmits antenna 332 (i.e., ANT2) are used. In SS 116, an FFT operation is performed on the received OFDM symbols in order to retrieve the information in the frequency domain. The data and pilot symbols carried on orthogonal subcarriers are separated in the frequency domain. The pilot signals are converted back to the time domain by performing an IFFT operation. In this process, the subcarriers carrying data are set to 0. Also, when an ANT1 OFDM symbol is generated, the subcarriers carrying ANT2 OFDM symbols are set to 0. Similarly, when an ANT2 OFDM symbol is generated, the subcarriers carrying the ANT1 OFDM symbols are set to 0.

SS 116 multiplies the pilot OFDM symbols from ANT1 with gain g0 and the pilot OFDM symbols from ANT2 with gain g1. The receiver also delays the pilots from ANT2 with delay D1. Again, these operations reverse the operations in OFDM symbol processing block 230 in FIG. 3, assuming only transmit antenna 331 (i.e., ANT1) and transmits antenna 332 (i.e., ANT2) are used. The two resulting pilots are then combined to get the overall pilot. An FFT operation is performed on the overall pilot to get the overall channel response in the frequency domain. The channel estimate in the frequency domain is then used for data demodulation in the frequency domain. This additional compensation on the pilot signals allows for estimation of the additional processing done in BS 102 on the OFDM symbols containing data. The effect of the actual radio channel is also reflected in the overall channel estimate because the received pilot signals travel via the radio channel.

The compensation needs to be done on the pilot symbols only, and not the data symbols, because the data symbols are already processed in BS 102. In an OFDM system, the pilot and data symbols are carried on OFDM subcarriers. Therefore, the compensation can either be done on the time domain OFDM symbol or directly in the frequency domain. In order to do compensation in the frequency domain, the affect of OFDM symbol delay in the time-domain must be accounted for in the frequency domain. In general, a time delay in the time domain translates into a phase rotation in the frequency domain. Therefore, the OFDM subcarriers carrying the pilot symbols may be appropriately phase rotated in the frequency domain to account for time delays.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method, comprising:
receiving an uplink signal;
determining a processing parameter for transmission of data on two antenna ports, the processing parameter including at least one of a time delay, a phase rotation and a gain based on the received uplink signal;
transmitting a first pilot and a second pilot; and
transmitting a first data symbol and a second data symbol on two antenna ports, at least one of the first data symbol and the second data symbol being processed based on the processing parameter.

2. The method of claim 1, wherein the first pilot and the second pilot are generated independently of the processing parameter, and wherein the processing parameter is a symbol processing parameter.

3. The method of claim 1, wherein the processing parameter is determined on a user-by-user basis.

4. The method of claim 1, wherein the time delay is in a time domain and the phase rotation is in a frequency domain.

5. The method of claim 1, wherein the uplink signal comprises at least one of an orthogonal frequency division multiplexing (OFDM) symbol processing parameter, an uplink pilot, and a preamble.

6. A method, comprising:
receiving a processing parameter for transmission of data on two antenna ports, the processing parameter including at least one of a time delay, a phase rotation and a gain determined based on a received uplink signal;

receiving a first pilot, a second pilot, a first data symbol and a second data symbol transmitted on the two antenna ports; and demodulating the first data symbol and the second data symbol based on the processing parameter, the first pilot and the second pilot.

7. The method of claim 6, wherein the first pilot and the second pilot are generated independently of the symbol processing parameter.

8. The method of claim 6, wherein the processing parameter is determined on a user-by-user basis.

9. The method of claim 6, wherein the time delay is in a time domain and the phase rotation is in a frequency domain.

10. The method of claim 6, wherein the demodulating further comprises:

estimating a channel using the first pilot, the second pilot and the processing parameter; and demodulating the first and second data based on the estimated channel.

* * * * *